(12) United States Patent
Curzi et al.

(10) Patent No.: US 9,282,074 B2
(45) Date of Patent: Mar. 8, 2016

(54) MULTI-VERSION MESSAGE CONDITION BASED DELIVERY

(71) Applicant: INTERNATIONAL BUSINESS MACHINES CORPORATION, Armonk, NY (US)

(72) Inventors: Francesca Curzi, Rome (IT); Francesco M. De Collibus, Rome (IT); Ilaria Gorga, Rome (IT); S. Benedetta Stasi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 14/324,337

(22) Filed: Jul. 7, 2014

(65) Prior Publication Data

US 2014/0325207 A1   Oct. 30, 2014

Related U.S. Application Data

(62) Division of application No. 13/341,397, filed on Dec. 30, 2011.

(51) Int. Cl.
*H04L 29/06* (2006.01)
*H04L 12/58* (2006.01)
*H04L 9/14* (2006.01)

(52) U.S. Cl.
CPC ........ *H04L 51/30* (2013.01); *H04L 9/14* (2013.01); *H04L 51/063* (2013.01); *H04L 63/0428* (2013.01); *H04L 63/108* (2013.01)

(58) Field of Classification Search
USPC .................................... 713/150; 709/206
See application file for complete search history.

(56) References Cited

U.S. PATENT DOCUMENTS

| | | | |
|---|---|---|---|
| 7,219,129 B2 * | 5/2007 | Weissman | G06Q 10/107 709/204 |
| 7,392,289 B2 | 6/2008 | Curry et al. | |
| 8,447,967 B1 * | 5/2013 | Janacek | H04L 63/0428 713/150 |
| 2002/0010746 A1 * | 1/2002 | Jilk, Jr. | G06F 17/3089 709/206 |
| 2006/0053199 A1 * | 3/2006 | Pricken | G06Q 10/107 709/206 |
| 2007/0208815 A1 | 9/2007 | Jania et al. | |
| 2009/0228558 A1 | 9/2009 | Brenner et al. | |

* cited by examiner

*Primary Examiner* — Amare F Tabor
(74) *Attorney, Agent, or Firm* — Patents on Demand P.A.; Brian K. Buchheit; Scott M. Garrett (57) ABSTRACT

A recipient message system receiving an email message set of two or more email messages and a related condition from a sender to a recipient. The recipient message system detects an attempt from the recipient to read the message set at a second time instance and evaluates the condition at the second time instance. If the evaluation of the condition results in the first evaluation value, the recipient is provided with the first email message in response to the attempt to read the message set, wherein the recipient is not able to read the second email message in this event. If the evaluation of the condition results in the second evaluation value, the recipient is provided with the second email message in response to the attempt to read the message set, wherein the recipient is not able to read the first email message in this event.

20 Claims, 6 Drawing Sheets

MULTI-VERSION MESSAGE CONDITION BASED DELIVERY

CROSS-REFERENCE TO RELATED APPLICATIONS

This divisional application claims the benefit of U.S. patent application Ser. No. 13/341,397 filed 30 Dec. 2011 entitled "Multi-version Message Condition Based Delivery." The entire contents of U.S. application Ser. No. 13/341,397 are incorporated by reference herein.

BACKGROUND

The present invention relates to condition-based electronic message delivery.

Today, modern business and other communication rely heavily on sending and receiving messages. That may be text-based messages, voice messages and continuously increasing video messages. Most of these communication message exchanges are asynchronous, meaning that a sending instance, e.g., an e-mail sender may write and may send an e-mail at one time instance, while the other communication person may receive the message at a different point in time. However, it may also happen, that the sender writes e-mails regarding the same topic at different time instances. One reason may be that environmental conditions may have been changed. On the other side, it may be the case that a certain message may only be important for a receiver up to a certain point in time, e.g. before the end of a working day, or before a certain decision. In this case, the sender may write a sequence of different conditions into the e-mail and the receiver may decide by himself, based on the context, which part of the message may be still relevant. The sender may also write several e-mails, each one for a specific potential event in the future. For the receiver this would mean that he may have to read through all the e-mails deciding, which of the messages sent may have the highest probability to be relevant at the time he may read the stream of e-mails, all relating to the same subjects.

BRIEF SUMMARY

According to one embodiment of the present invention, a method, system, computer program product, or apparatus for condition-based message delivery on a sending message server. In the embodiment, a first message, a second message, and a condition at a first time instance of time can be received. The first message can be encrypted with a first encryption key. The second message can be encrypted with a second encryption key. The first and the second encrypted message can be sent to a recipient message system. A request can be received from the recipient message system at a second time instance for sending one of two decryption keys corresponding to either the first or the second encryption key. The first decryption key or the second decryption key can be sent depending on the condition to the recipient message system.

DETAILED DESCRIPTION

There may be a need for an improved architecture, method and system design to properly, reliably and with little overhead, sending and receiving messages, such as e-mails, based on certain conditions. This need was identified during the course of the disclosure have been resolved by details expressed herein.

Specifically, an embodiment of the disclosure is for condition-based message delivery. The embodiment may comprise receiving a first message, a second message and a condition on a sending message server at a first time instance. The method may also comprise encrypting the first message with a first encryption key and encrypting the second message with a second encryption key as well as sending the first and the second message to a recipient message system. Moreover, the method may comprise receiving a request from the recipient message system at a second time instance for one of the decryption keys corresponding to either the first or the second encryption key, and sending the first decryption key or the second decryption key depending on the condition to the recipient message system.

It should be noted that the sending message server may, in particular, be an e-mail server. The message may have been sent from an e-mail client. The messages may be sent separately or wrapped together with the condition in one message. This may be referred to as multi-version e-mail.

Furthermore, the recipient message system may, in particular, be an e-mail client. However, a receiving message server may be connected in-between the sending message server and the receiving or recipient message system, e.g., an e-mail client.

The message may, in particular be an e-mail. It should also be noted that, in particular, a plurality of messages, e.g., n messages, may be sent or wrapped together with n−1 conditions.

The request may be triggered automatically by an automatically generated return receipt of an e-mail.

It may also be noted that the condition may be a time condition, or another external condition like a weather situation, a stock price development, news, information from a RSS feed (RSS=Really Simple Syndication for message feed on the Internet), industrial events coming from environmental sensors, like RFID systems, GPS systems, pressure sensors, speed sensors, or other device controlling sensors, and others. In some case, information parsing may be required, in particular, if the information comes in as text-based messages.

In the context of this application, the following principle terms are used:

Message—The term message may denote any type and format of an information resource. In the simplest form, it may be an e-mail. However, other message types may be possible like a voice message, a fax message, a video message, an SMS message (short message service), a MMS message (multi-media message service), a chat-message or any other type of message.

Message server—The term message server may denote a store and forward messaging system that may be suited to handle the relevant message type as discussed above. It may receive a message, e.g., an e-mail from an e-mail client and forward it to other message servers, e.g., e-mail servers, or other e-mail clients directly.

Condition—The term condition may denote any logical condition applicable for events, e.g., a time instance before a delivery may be performed.

Request—The term request may denote a message asking for specific information, e.g., a specific encryption or decryption key. Such a request may be sent from the receiving message system to the sending message server.

The above-described method for condition-based message delivery may provide a couple of advantages. In particular, the method may reduce the number of e-mails a user may need to read if environmental conditions may have been changed in the meantime, such that their content may not be relevant any longer. Additionally, required computational activities may be performed on a server. This may reduce the requirements message systems generally have. Hence, no special provisions may be required at the recipient message system. The request for sending a decryption key may be based on an automatic "received return message". Basically, all conventional message systems, in particular e-mail systems, have such a function.

A first message may be useless after a certain time instance. Only a second message may then be relevant to a user of a messaging system. Multiple dependencies of messages and conditions may be defined, thus, reducing a potential information overload even more. The method may also be suitable to selectively perform user message delivery, depending on other environmental conditions like stock prices, alarm systems, etc.

In one embodiment of the method, the first message and the second message may each be part of a multi-version message. The messages may be created in a dedicated application program displaying both versions at the same time. This may allow a user to recognize the logical context of both messages and potentially also a condition, alternatively a plurality of messages and a plurality of conditions.

In another embodiment of the method, also the condition may be part of the multi-version message. This may allow an easier storage on the sending message server side. The messages and the condition do not need to be stored separately but may be processed as one information item.

In again another embodiment of the method, the first message, the second message and the condition may originate from a first e-mail client. In case of the message may be an e-mail, an email client may be a natural choice. However, the e-mail client may also comprise an include chat functionality. In this case, the e-mail client may also be used for a condition-based message delivery for a chat system. The same may apply for other types of messages. Voice mail may as well be integrated in an e-mail client as it may be the case for video messages. In a universal communication system, all different kind of messages may be managed. Instead of an e-mail client, other interactive message handling systems may be used, e.g, a universal message handling client.

In yet another embodiment of the method, the first message and the second message may each be selected from the group consisting of an e-mail message, a voice message, a fax message, a video message, an SMS message, a MMS message, and a chat-message. This feature has been already discussed above. However, it should be noted that the inventive concept may not be limited to condition-based e-mail exchange only. Voice of video messages may be quite long and time consuming to listen to. A condition-based delivery may save a lot of time for a user.

In again another embodiment of the method, also the recipient message system may be an e-mail client. This may enable the same advantages as already discussed for the sending message system.

In a further embodiment of the method, the condition is at least time-based. Time-based conditions may have a broad application field. E-mails may be especially time dependent. However, also other conditions may be relevant as discussed throughout this application. Because the recipient message system may request at a second time instance, which may be different to the first time instance, that the multi-version message may be generated or sent, a time-based condition may be relatively easy to implement on the sending message server.

In another advanced embodiment of the method, the first, the second message and the condition may comprise an identical identifier. This enabled the sending message server and a related the engine for condition-based message delivery to treat the different components as one linked entity. Correct decryption keys may be requested from the sending message server and sent from the sending message server. An identical identifier may be seen as the glue between the components of a multi-version message. This also applies for the case in which the multi-version message may comprise not just two messages, but a plurality of messages and conditions.

The disclosure is now described within the context of one or more embodiments, although the description is intended to be illustrative of embodiments of the invention as a whole, and is not to be construed as limiting other embodiments of the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
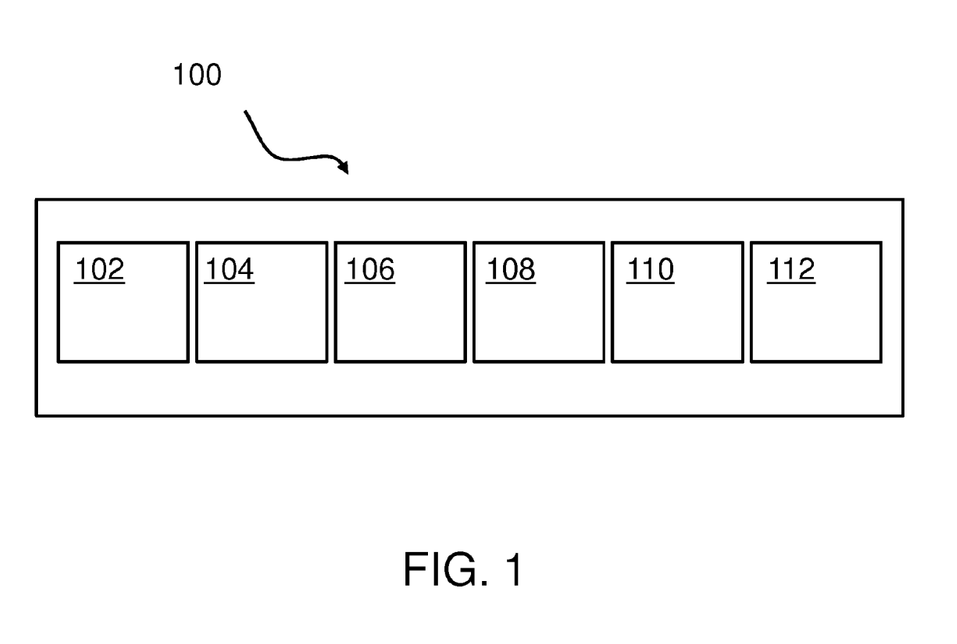
FIG. 1 shows a block diagram of an embodiment of the inventive method.

FIG. 1 shows a block diagram of an embodiment of the method 100 for condition-based message delivery. The method may comprise receiving, 102, a first message, a second message and a condition on a sending message server at a first time instance.

The method 100 may also comprise encrypting, 104, the first message with a first encryption key and encrypting, 106, the second message with a second encryption key as well as sending, 108, the first and the second message to a recipient message system. Furthermore, the method 100 may comprise receiving, 110, a request from the recipient message system at a second time instance for sending one of two decryption keys corresponding to either the first or the second encryption key, and sending, 112, the first decryption key or the second decryption key depending on the condition to the recipient message system.

Figure 2:
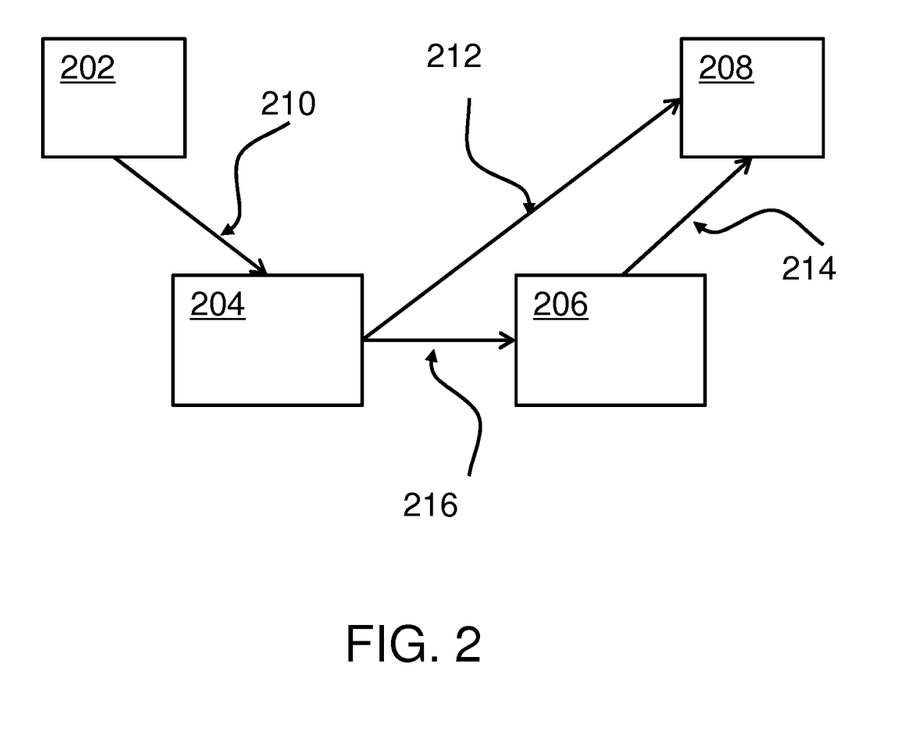
FIG. 2 shows a block diagram of embodiments of elements involved in the method.

FIG. 2 shows a block diagram of embodiments of elements involved in the method. A sending message system 202 may send, 210, a message, e.g., two e-mails together with a condition, to a message server 204, e.g., an e-mail server. A conventional protocol like an Simple Mail Transfer Protocol SMTP, Post Office Protocol (POP)/Internet message access protocol (IMAP) message transmission protocol, or another protocol may be used.

The e-mails may be sent separately from the sending client 202 to the message server 204 or wrapped together as one message, referred to as multi-version message or multi-version e-mail. A user may use an interface allowing to input the two or more e-mails and the condition(s). In order to have a linkage between the different information pieces, i.e., the first message, the second message and the condition, all three parts may comprise an identical, unique identifier in form of a character string that may also be transmitted from the system 202 to the system 204 at a first time instance.

There may also be provided a recipient or receiving message client 208 and/or a receiving message server 206. The message server 206 may be serving the receiving message client 206 via connection 214. The message server 206 may receive messages via connection 216.

Examples of three messages M1, M2 and M3 may be:

TABLE 1

| | |
|---|---|
| M1 | Bring your umbrella with you, it may rain tomorrow. |
| M2 | I hope you brought your umbrella with you since we had really a rain storm today. |
| M3 | Luckily, the weather forecast was mistaken, and we are enjoying a the warm sun. |

M1, M2 and M3 may represent three different versions of an email. However, they may be generated at the same time with conditions also generated at the same time without knowing a status of a future condition, in this example, a weather condition.

The messages may not be sent in a way that the receiver may read all of them. The messages may be encrypted, such that the receiving systems may not be able to display any content—apart from subject line—of any of the messages to a use without using a decryption key.

Conditions, generated together with the messages, e.g., e-mails may have—as an example—the form of:

TABLE 2

| M1 | Bring your umbrella with you, it may rain tomorrow. | C1 | If reading time < 16/9/2009 hour 7:00 |
|---|---|---|---|

TABLE 2-continued

| | | | |
|---|---|---|---|
| M2 | I hope you brought your umbrella with you since we had really a rain storm today. | C2 | If reading time > 16/9/2009 hour 7:00 and meteo_webservice = rain |
| M2 | Luckily, the weather forecast was mistaken, and we are enjoying the warm sun. | C3 | If reading time > 16/9/2009 hour 7:00 and meteo_webservice = sun |

Thus, the messages used as examples are unchanged if compared to Table 1, however, certain conditions may be defined in addition. The conditions C1, C2 and C3 may be self-explanatory in this example.

A subject line of the e-mail may be the same for all three messages. The message server may also only send one subject line to the message client.

Figure 3:
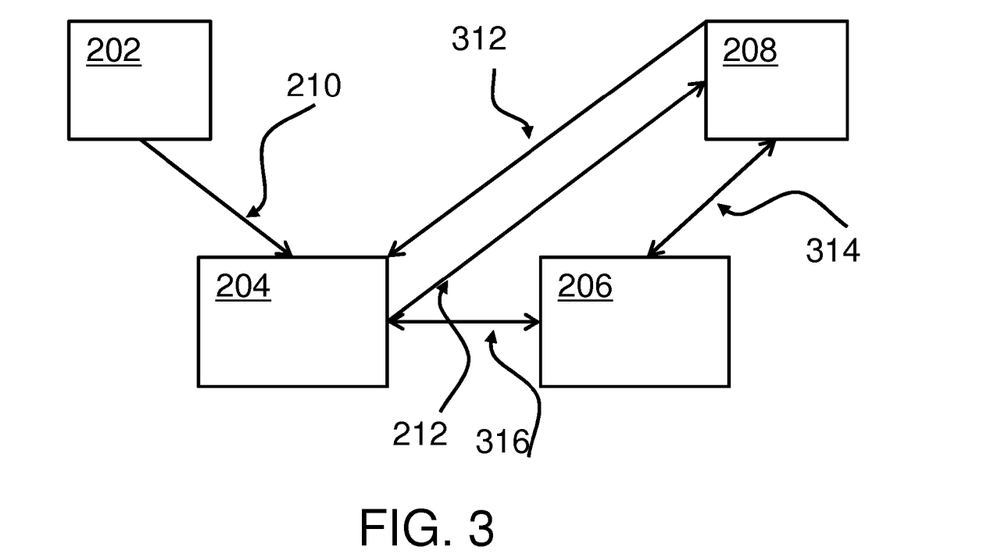
FIG. 3 shows another block diagram of elements involved in the method at a different time instance in accordance with an embodiment of the disclosure.

FIG. 3 shows another block diagram of elements involved in the method at a different time instance. Before sending, 212, the messages to the system 208—either direct or alternatively, via recipient message server 206 and connections 314 and 316—the sending message server 204 may encrypt the messages with a key before sending them. Every message will be encrypted with a corresponding, unique key. The keys may be generated using a random key generator (not shown). The key may be stored in a permanent storage system of the sending message server. Thus, the messages may not be read at the receiving system 208. Only subject lines of relevant e-mail lines may be readable.

If a reader opens at a second time instance, which may be different to the first time instance, his e-mail system, a request 312 may be generated at the recipients message system 208 and may be send to the sending message server 204, either directly or indirectly, e.g., via recipient message server 206 and connections 314 and 316. The request may be implemented as a requested "return receipts" as part of the sent e-mail. This return receipt may be generated automatically on the recipient message system at the time instance e-mails may be downloaded or displayed to/by the recipient message system 208. The condition may be evaluated at the sending message server 204 and depending on the result of that test, a message may be sent to the recipient message system 208 comprising a corresponding decryption key. With the help of this key, the corresponding message may be displayed on the recipient message system 208. In case the messages are voice or other type of messages, access to the corresponding message will be granted. The remaining messages will remain unreadable or inaccessible and may be deleted without any attention from a user. In case of the above example—compare table 2—the receiver may open his email system at e.g., 8:30 on 16 Sep. 2010. Via a RSS feed from a weather forecast system, the sending message server 204 may have isolated the information that the weather is bad, meaning that it may be raining. A variable called e.g., "metro_web-service" in a condition-decision module may have been set to "rain". Thus, C2 may be verified and a decryption key to decrypt M2 may be sent by the sending message server 204 to the receiving message system 208. Only M2 will be made readable or accessible by decrypting this message. The other messages will not be readable or accessible and may, optionally, be deleted. In another embodiment, the user may delete them manually.

Figure 4:
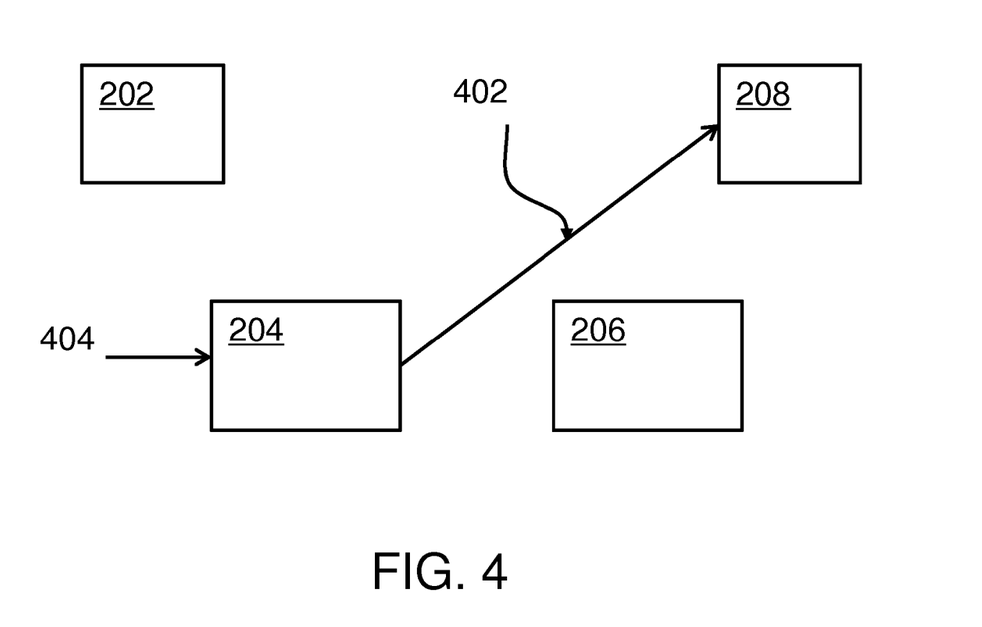
FIG. 4 shows another block diagram of elements involved in the method at again a different time instance in accordance with an embodiment of the disclosure.

FIG. 4 shows symbolically the sending of the key that related to the condition to the recipients message system 208. This key may be used to decrypt the message at the recipient message system 208 such that it may be readable by a user.

It should be noted that the condition may also require a reaction to external variable conditions instead of time conditions only. For this purpose, the sending message server 204 may receive external information 404. As discussed above, this information may be based on virtually any receivable external information. E.g., the condition may be related to a stock price received from e.g., an RSS feed or from other external information sources. In one embodiment, one e-mail may be dedicated to a buy order for stocks. Another e-mail may be dedicated to a sell order. Only one e-mail may be delivered to a bank depending on received stock price information by the sending message server at a certain point in time. Conditions may be nested, combined by logical "and" or logical "or" statements. Actually, any combination of content of messages and conditions of any kind and number may be possible.

The information may be received, e.g., in XML format for an interpretation by the sending message server. Other formats may be possible. It may also relate to GPS (global positioning system) data, received RFID tag data. For this purpose, the sending message server needs to be connected to an RFID reader station, potentially via a network.

Figure 5:
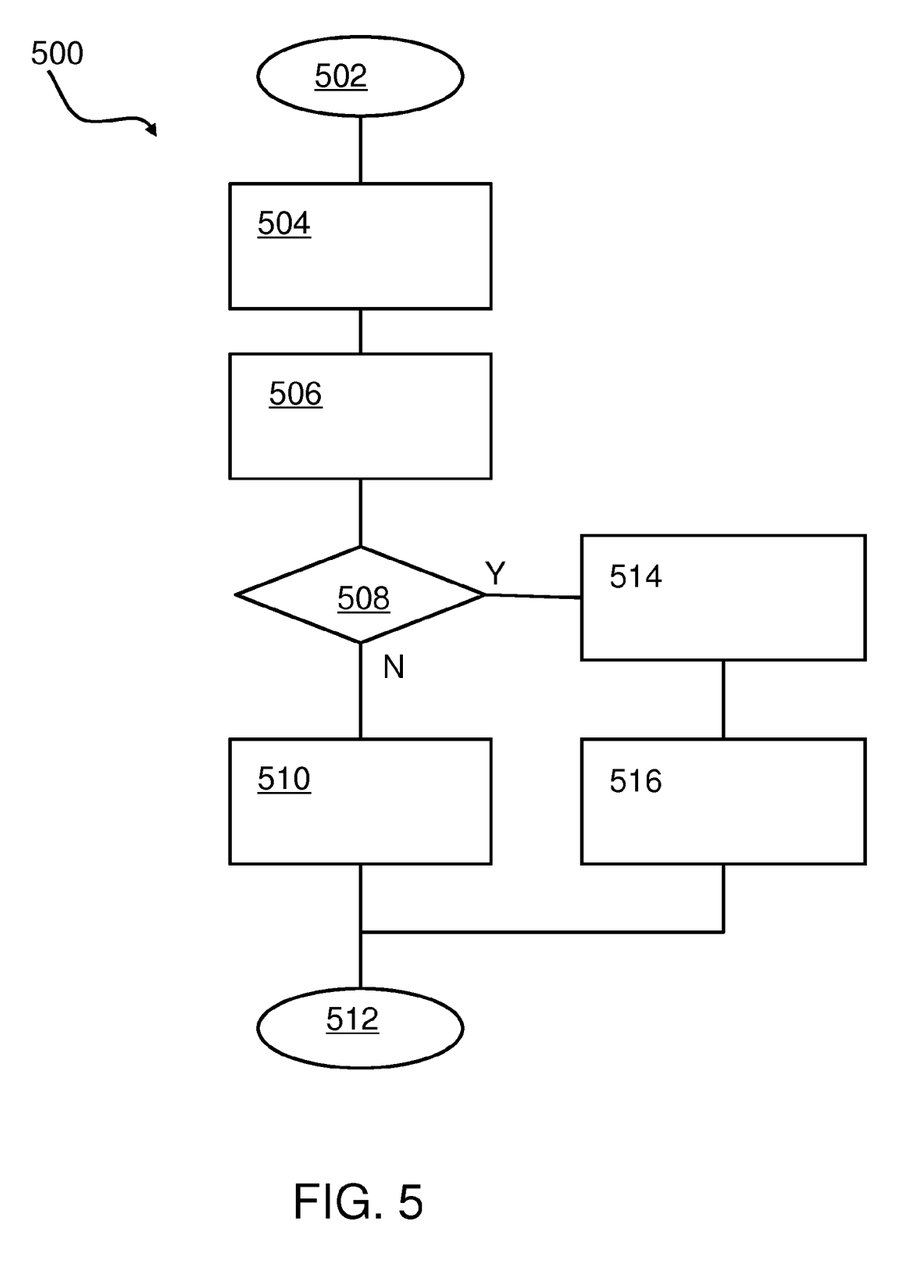
FIG. 5 shows an embodiment of a flow chart for an alternative solution in accordance with an embodiment of the disclosure.

An alternative solution, shown in FIG. 5, may work as follows: The algorithm may start at 502. A sending e-mail client may send a multi-version message, e.g., a multi-version e-mail, to a message server, 504. Three e-mails may be created by the message sending client system, one for each variation of the message and one for the condition. An optional field of a Simple Mail Transfer Protocol (SMTP) protocol may be set to a mail id (identification). The mail id may be made up of the same prefix identifying all three messages and of an additional character set in the following way:

For the two different messages, the optional field may hold an id specifying the real message id. For the condition, the optional field may be set to "C". When a user may start to download his e-mails from a server, the receiving message system may start, 506, to download the specified messages.

The recipient message system may constantly check, 508, the optional field of every message. If the client system may detect that the optional field may be set to "C", it may recognize that this may be related to a multi-version e-mail. It may download the condition and may verify it, 514. Otherwise, in case of "N", the messages may be downloaded the conventional way, 510.

Once a result of the verification may be obtained, the correct message may be downloaded, 516, by using the information in the optional field, i.e., the message id. The message matching the number may be the correct message. The other messages having the same id but not conforming to the condition, may be deleted automatically. The algorithm may end at 512.

In order to make such a solution work, it may be required to send the three messages in a predefined order. The condition may be sent before the other content carrying messages.

Figure 7:
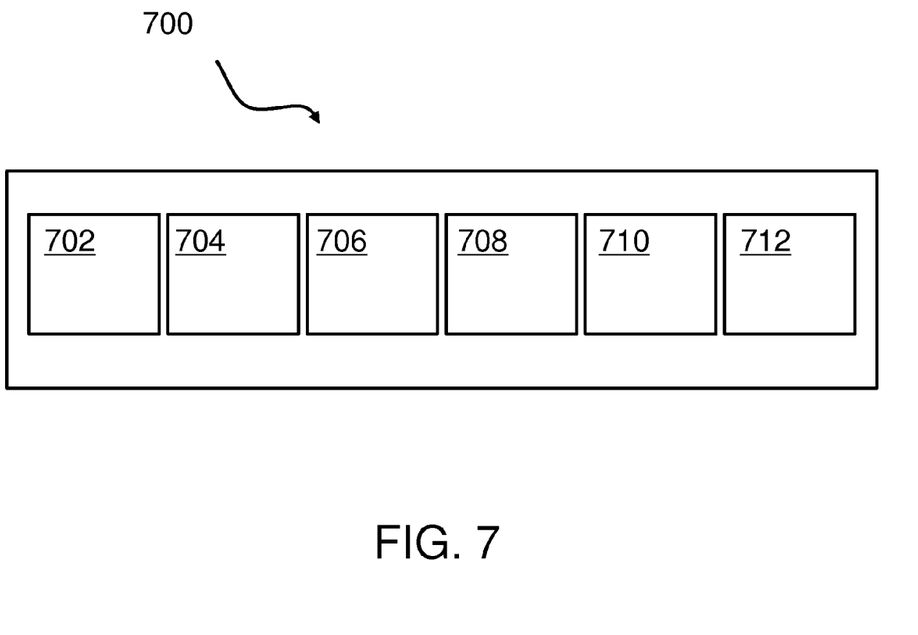
FIG. 7 illustrates the inventive engine for condition-based message delivery in accordance with an embodiment of the disclosure.

FIG. 7 may show an embodiment of the inventive engine 700 for condition-based message delivery. The engine 700 for condition-based message delivery may comprise a receiving unit 702, adapted for receiving a first message, a second message and a condition on a sending message server at a first time instance, a first encrypting unit 704 adapted for encrypting the first message with a first encryption key, and a second encrypting unit 706, adapted for encrypting the second message with a second encryption key. Furthermore, there may be provided a sending unit 708, adapted for sending the first and the second message to a recipient message system, and a receiving unit 710, adapted for receiving a request from the recipient message system at a second time instance for sending one of two decryption keys corresponding to either the first or the second encryption key, and a sending unit 712, adapted for sending the first decryption key or the second decryption key depending on the condition to the recipient message system.

Figure 6:
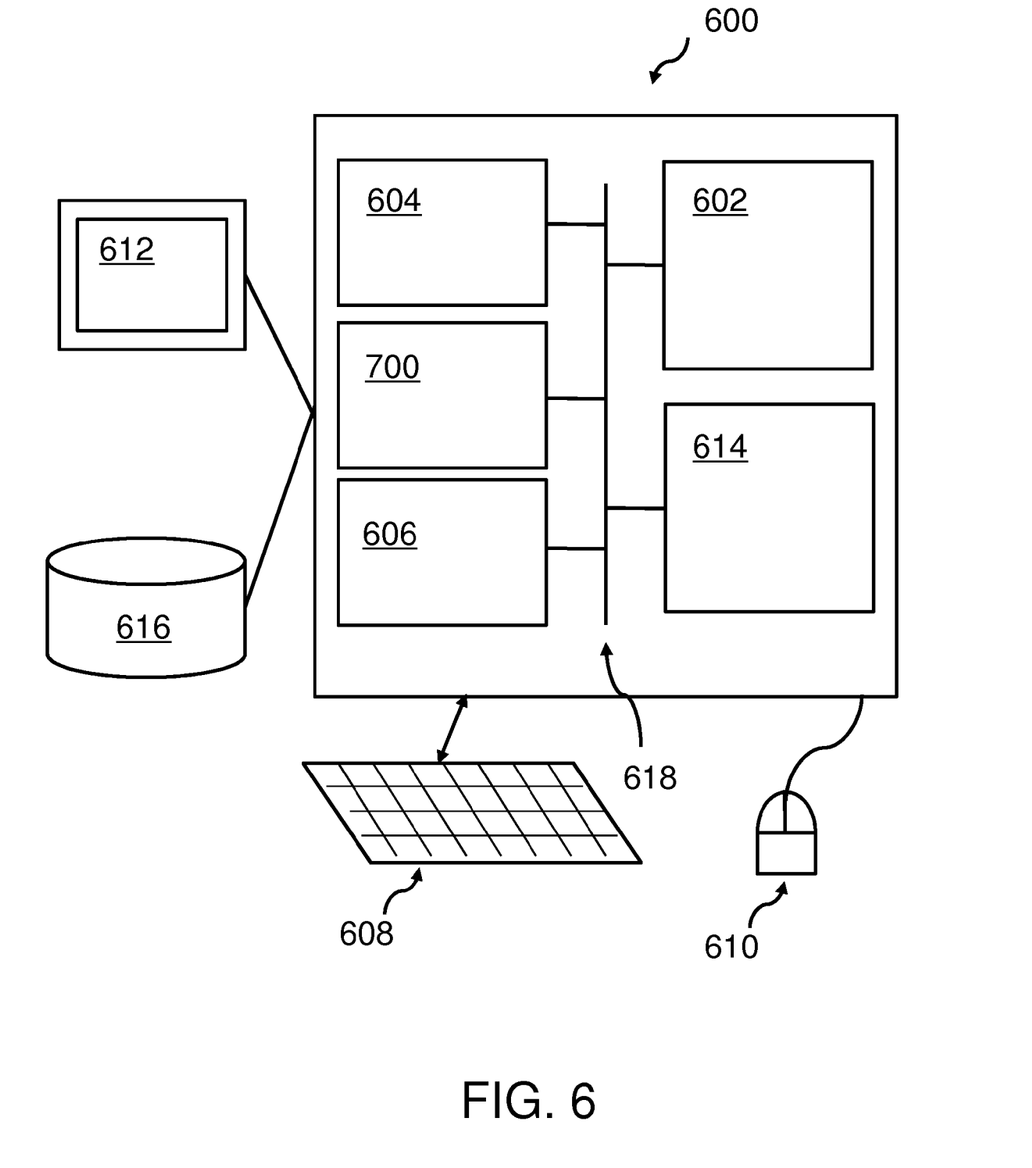
FIG. 6 shows an embodiment of a computer system comprising the inventive engine in accordance with an embodiment of the disclosure.

Embodiments of the invention may be implemented on virtually any type of computer, regardless of the platform being used suitable for storing and/or executing program code. For example, as shown in FIG. 6, a computer system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities typical of today's computers (not shown). The memory elements 604 may include a main memory, employed during actual execution of the program code, and a cache memory, which provides temporary storage for at least some program code or data in order to reduce the number of times, code must be retrieved from external bulk storage 616 for execution. Elements inside the computer 600 may be linked together by means of a bus system 618 with corresponding adapters. Additionally, an engine 700 for condition-based message delivery may be attached to the bus system 618.

The computer system 600 may also include input means, such as a keyboard 608, a mouse 610, or a microphone (not shown). Furthermore, the computer 600 may include output means, such as a monitor 612 [e.g., a liquid crystal display (LCD), a plasma display, a light emitting diode display (LED), or a cathode ray tube (CRT) monitor]. The computer system 600 may be connected to a network (e.g., a local area network (LAN), a wide area network (WAN), such as the Internet, or any other similar type of network, including wireless networks via a network interface connection 614. This may allow a coupling to other computer systems. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

Further, those skilled in the art will appreciate that one or more elements of the aforementioned computer system 600 may be located at a remote location and connected to the other elements over a network. Further, embodiments of the invention may be implemented on a distributed system having a plurality of nodes, where each portion of the invention may be located on a different node within the distributed system.

In one embodiment of the invention, the node corresponds to a computer system. Alternatively, the node may correspond to a processor with associated physical memory. The node may alternatively correspond to a processor with shared memory and/or resources or a smartphone.

The flowchart and block diagrams in the FIGS. 1-7 illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising:

a recipient message system receiving an email message set of two or more email messages and a related condition from a sender to a recipient, wherein each of the two or more email messages comprise different content specified by the sender, wherein the email message set was sent at a first time instance, wherein a first email message of the email message set corresponds to a first evaluation value of the condition and wherein a second email message of the email message set corresponds to a second evaluation value of the condition;

the recipient message system detecting an attempt from the recipient to read the message set at a second time instance;

the recipient message system evaluating the condition at the second time instance;

if the evaluation of the condition results in the first evaluation value, providing the recipient with the first email message in response to the attempt to read the message set, wherein the recipient is not able to read the second email message in this event; and if the evaluation of the condition results in the second evaluation value, providing the recipient with the second email message in response to the attempt to read the message set, wherein the recipient is not able to read the first email message in this event.

2. The method of claim 1, wherein the first and second messages are encrypted with different encryption keys having different corresponding decryption keys, wherein responsive to the evaluating of the condition at the second time, a decryption key for one of the messages that corresponding to an evaluation state of the condition is sent to the recipient message system and is used by the recipient message system to decrypt the message before it is provided to the recipient.

3. The method of claim 1, wherein the condition has a deterministic value that varies over time, wherein the deterministic value for the condition at the second time instance is unknown by the sender at the first time instance.

4. The method of claim 1, wherein the condition is a comparison of a current time against at least one previously defined threshold.

5. The method of claim 1, wherein the condition is a weather condition occurring at a geographic location associated with a recipient of the message at a time the message is read.

6. The method of claim 1, wherein the condition is dependent on information received from a really simply syndication (RSS) feed at the time the message is read.

7. The method of claim 1, wherein the condition is evaluated at the time the message is read, wherein the condition has a deterministic value, which is unknown at the time the message was sent.

8. The method according to claim 1, wherein the first email message and the second email message are each part of a multi-version email message, wherein the condition is part of the multi-version message.

9. A computer system comprising:
one or more processors, one or more computer-readable memories and one or more computer-readable, non-transitory storage devices;
program instructions, stored on at least one of the one or more storage devices for execution by at least one of the one or more processors via at least one of the one or more memories, to receive at a recipient messaging system an email message set of two or more email messages and a related condition from a sender to a recipient, wherein each of the two or more email messages comprise different content specified by the sender, wherein the email message set was sent at a first time instance, wherein a first email message of the email message set corresponds to a first evaluation value of the condition and wherein a second email message of the email message set corresponds to a second evaluation value of the condition;
program instructions, stored on at least one of the one or more storage devices for execution by at least one of the one or more processors via at least one of the one or more memories, to detect an attempt from the recipient to read the message set at a second time instance;
program instructions, stored on at least one of the one or more storage devices for execution by at least one of the one or more processors via at least one of the one or more memories, to evaluate the condition at the second time instance;
program instructions, stored on at least one of the one or more storage devices for execution by at least one of the one or more processors via at least one of the one or more memories, to, if the evaluation of the condition results in the first evaluation value, provide the recipient with the first email message in response to the attempt to read the message set, wherein the recipient is not able to read the second email message in this event; and
program instructions, stored on at least one of the one or more storage devices for execution by at least one of the one or more processors via at least one of the one or more memories, to, if the evaluation of the condition results in the second evaluation value, provide the recipient with the second email message in response to the attempt to read the message set, wherein the recipient is not able to read the first email message in this event, wherein the condition has a deterministic value that varies over time, wherein the deterministic value for the condition at the second time instance is unknown by the sender at the first time instance.

10. The computer system of claim 9, wherein the first and second messages are encrypted with different encryption keys having different corresponding decryption keys, wherein responsive to the evaluating of the condition at the second time, a decryption key for one of the messages that corresponding to an evaluation state of the condition is sent to the recipient message system and is used by the recipient message system to decrypt the message before it is provided to the recipient.

11. The computer system of claim 9, wherein the condition has a deterministic value that varies over time, wherein the deterministic value for the condition at the second time instance is unknown by the sender at the first time instance.

12. The computer system of claim 9, wherein the condition is a comparison of a current time against at least one previously defined threshold.

13. The computer system of claim 9, wherein the condition is a weather condition occurring at a geographic location associated with a recipient of the message at a time the message is read.

14. The computer system of claim 9, wherein the condition is dependent on information received from a really simply syndication (RSS) feed at the time the message is read.

15. The computer system of claim 9, wherein the condition is evaluated at the time the message is read, wherein the condition has a deterministic value, which is unknown at the time the message was sent.

16. The computer system of claim 9, wherein the first email message and the second email message are each part of a multi-version email message, wherein the condition is part of the multi-version message.

17. A computer program product comprising:
one or more non-transitory computer-readable, storage devices;
program instructions, stored on at least one of the one or more storage devices, to receive at a recipient messaging system an email message set of two or more email messages and a related condition from a sender to a recipient, wherein each of the two or more email messages comprise different content specified by the sender, wherein the email message set was sent at a first time instance, wherein a first email message of the email message set corresponds to a first evaluation value of the condition and wherein a second email message of the email message set corresponds to a second evaluation value of the condition;
program instructions, stored on at least one of the one or more storage devices, to detect an attempt from the recipient to read the message set at a second time instance;
program instructions, stored on at least one of the one or more storage devices, to evaluate the condition at the second time instance;
program instructions, stored on at least one of the one or more storage devices, to if the evaluation of the condition results in the first evaluation value, provide the recipient with the first email message in response to the attempt to read the message set, wherein the recipient is not able to read the second email message in this event; and
program instructions, stored on at least one of the one or more storage devices, to if the evaluation of the condition results in the second evaluation value, provide the recipient with the second email message in response to the attempt to read the message set, wherein the recipient is not able to read the first email message in this event, wherein the condition has a deterministic value that varies over time, wherein the deterministic value for the condition at the second time instance is unknown by the sender at the first time instance.

18. The computer program product of claim 17, wherein the first and second messages are encrypted with different encryption keys having different corresponding decryption keys, wherein responsive to the evaluating of the condition at the second time, a decryption key for one of the messages that corresponding to an evaluation state of the condition is sent to the recipient message system and is used by the recipient message system to decrypt the message before it is provided to the recipient.

19. The computer program product claim 17, wherein the condition has a deterministic value that varies over time, wherein the deterministic value for the condition at the second time instance is unknown by the sender at the first time instance.

20. The computer program product of claim 17, wherein the condition is a comparison of a current time against at least one previously defined threshold.

\* \* \* \* \*